United States Patent [19]
Kobayashi et al.

[11] Patent Number: 5,566,179
[45] Date of Patent: Oct. 15, 1996

[54] BROADBAND SWITCHING NETWORKS

[75] Inventors: Hiroshi Kobayashi, Tokyo; Toshikazu Kodama, Kanagawa-ken; Keiichi Obara, Tokyo, all of Japan

[73] Assignee: Kabushiki Kaisha Toshiba, Kanagawa-ken, Japan

[21] Appl. No.: 315,495

[22] Filed: Sep. 30, 1994

Related U.S. Application Data

[63] Continuation of Ser. No. 747,240, Aug. 19, 1991, abandoned.

[30] Foreign Application Priority Data

Aug. 18, 1990 [JP] Japan ................... 2-217677

[51] Int. Cl.$^6$ ................................................. H04J 3/00
[52] U.S. Cl. ........................... 370/85.15; 370/85.12; 370/85.13; 370/85.14; 370/94.1
[58] Field of Search .................... 370/94.1, 60, 58.1, 370/110.1, 85.7, 85.12, 85.13, 85.14, 85.15, 60.1, 95.1

[56] References Cited

U.S. PATENT DOCUMENTS

| | | | |
|---|---|---|---|
| 4,569,041 | 2/1986 | Takeuchi et al. | 370/85.12 |
| 4,663,748 | 5/1987 | Karbowiak et al. | 370/85.12 |
| 4,875,206 | 10/1989 | Nichols et al. | 370/85.15 |
| 4,947,390 | 8/1990 | Sheehy | 370/85.13 |
| 4,955,019 | 9/1990 | Mizuhara et al. | 370/85.7 |
| 5,130,984 | 7/1992 | Cisneros | 370/94.1 |
| 5,134,612 | 7/1992 | Yoshimura | 370/84 |
| 5,187,706 | 2/1993 | Frankel et al. | 370/85.14 |
| 5,214,648 | 5/1993 | Lespagnol et al. | 370/94.1 |
| 5,280,475 | 1/1994 | Yanagi et al. | 370/60 |
| 5,282,207 | 1/1994 | Jurkevich et al. | 370/94.1 |
| 5,289,462 | 2/1994 | Ahmadi et al. | 370/79 |

FOREIGN PATENT DOCUMENTS

| | | |
|---|---|---|
| 0119105 | 9/1984 | European Pat. Off. . |
| 2-195751 | 8/1990 | Japan . |

OTHER PUBLICATIONS

E. Matthias et al., "Strategy for an ATM Interconnect Network", Proceedings International Switching Symposium, vol. 4, May 28 through Jun. 1, 1990, pp. 29–33.

H. Yamashita et al., "Flexible Synchronous Broad–Band Subscriber Loop System: Optical Shuttle Bus", IEEE Journal of Lightwave Technology, vol. 7, No. 11, Nov. 1989, pp. 1788–1797.

S. J. Golestani, "Congestion–Free Communication in Broadband Packet Networks", IEEE International Conference on Communications, vol. 2, Apr. 15–19, 1990, pp. 489–494.

"Recommendations Drafted by Working Party XVIII/8 (General B–ISDN Aspects) to be Approved in 1990" by the Study Group XVIII (Geneva Meeting, 23–25 May 1990), CCITT Report R 34.

Feng 'A Survey of Interconnection Networks' IEEE Computer, 1981, Dec. 12–27.

*Primary Examiner*—Douglas W. Olms
*Assistant Examiner*—Shick Hom
*Attorney, Agent, or Firm*—Finnegan, Henderson, Farabow, Garrett & Dunner, L.L.P.

[57] ABSTRACT

A broadband switching network for transmitting information by using a cell composed of an information field and a header, including a first network comprising an ATM ring having a plurality of access nodes for multiplexing and demultiplexing the cell and a ring shape transmission path for connecting the plurality of access nodes in a ring shape so as to transmit the cell, and at least one second network, wherein the first network being connected to at least one second network via one of the plurality of access nodes, each second network having a switching function for switching the cell.

16 Claims, 8 Drawing Sheets

CHARACTERISTICS AND RATIOS OF TYPES OF TERMINAL EQUIPMENTS

| | TERMINAL TYPE | ALL SERVICE TYPE CATEGORY | MAXIMUM TRANSMISSION RATE (MB/S) | AVERAGE TRANSMISSION RATE (MB/S) | ASYMMETRICAL COEFFICIENT | RATIOS OF TYPES OF TERMINAL EQUIPMENTS (%) |
|---|---|---|---|---|---|---|
| ① | NARROW BAND ISDN TERMINAL EQUIPMENT (STM TERMINAL EQUIPMENT) | 1 | 0.09 | 0.09 | 1.00 | 45.4 |
| ② | NON-REAL TIME SEVERAL MB/S TRANSMISSION RATE TERMINAL EQUIPMENT | 3/4 | 2.20 | 0.60 | 0.61 | 39.0 |
| ③ | REAL TIME SEVERAL MB/S TRANSMISSION RATE TERMINAL EQUIPMENT | 2 | 1.83 | 0.74 | 0.59 | 6.5 |
| ④ | BROAD BAND ISDN INTERMEDIATE TERMINAL EQUIPMENT (H2) | 2 | 40.00 | 11.78 | 0.50 | 9.1 |
| ⑤ | BROAD BAND ISDN HIGH TRANSMISSION RATE TERMINAL EQUIPMENT (H4) | B | 145 | 106 | 0.50 | FEW |

FIG. 3

OUTLINE AND EXAMPLE OF CONSTRUCTION OF SYSTEM ARCHITECTURE

| | SMALL CAPACITY SYSTEM | INTERMEDIATE CAPACITY SYSTEM | LARGE CAPACITY SYSTEM | |
|---|---|---|---|---|
| NUMBER OF TERMINAL EQUIPMENT INTERFACES | ~400 | ~1600 | ~6000 | ~16000 |
| NUMBER OF ATMR'S | 1 | ~4 | ~15 | ~40 |
| NUMBER OF ATMR'S | — | 1 | ~6 | ~8 |
| ATMT SWITCH SIZE | — | 16 × 16 | 16 × 16 | 32 × 32 |
| ATMR CALL PROCESS CAPACITY (BHCA) | ≧5400 | ≧7200 | ≧7200 | ≧7200 |
| ATMT CALL PROCESS CAPACITY (BHCA) | — | ≧28800 | ≧28800 | ≧43200 |
| STAGE REQUIRED — INTRODUCTION STAGE | ○ | | | |
| STAGE REQUIRED — DEVELOPMENT STAGE | ○ | ○ | | |
| STAGE REQUIRED — POPULARIZATION STAGE | ○ | ○ | ○ | ○ |

FIG. 6
LOOP NETWORK CONNECTION

FIG. 7
WHEEL SHAPE CONNECTION

FIG. 8
RING SHAPE CONNECTION

FIG. 9 COMPARISON OF CONNECTION METHODS AMONG ATMT'S

| NUMBER OF TERMINAL EQUIPMENT INTERFACES | 4000 TERMINAL EQUIPMENT INTERFACES | | | 6000 TERMINAL EQUIPMENT INTERFACES | | | 16000 TERMINAL EQUIPMENT INTERFACES | | |
|---|---|---|---|---|---|---|---|---|---|
| CONNECTION METHOD | LOOP | WHEEL SHAPE | RING SHAPE | LOOP | WHEEL SHAPE | RING SHAPE | LOOP | WHEEL SHAPE | RING SHAPE |
| NUMBER OF ATMR SYSTEMS | | 10 | | | 15 | | | 40 | |
| NUMBER OF ATMT PORTS | | 16 | | | 16 | 32 | 16 | 32 | 64 |
| NUMBER OF ATMT'S | | 4 | | | 6 | 3 | 16 | 8 | 4 |
| NUMBER OF ATMR CONNECTION PORTS | | 5 | | | 5 | 10 | 5 | 10 | 20 |
| NUMBER OF ATMT CONNECTION PORTS | 4 | 6 | 6 | 5 | 6 | 8 | 5 | 14 | 22 |
| NUMBER OF OFFICE LINE CONNECTION PORTS | | 3 | | | 3 | 5 | 3 | 5 | 10 |
| ATMT PORT UTILIZATION EFFICIENCY | 12/16 | 14/16 | 14/16 | 13/16 | 14/16 | 23/32 | 13/16 | 29/32 | 52/64 |
| LOOP TRANSMISSION RATE (Gb/s) | 2.3 | — | — | 3.3 | — | — | 8.0 | — | — |

BROADBAND SWITCHING NETWORKS

This application is a continuation of application Ser. No. 07/747,240, filed Aug. 19, 1991, now abandoned.

BACKGROUND OF THE INVENTION

1. Field of the Invention

The present invention relates to broadband switching networks based on a broadband ISDN using ATM (Asynchronous Transfer Mode) technologies for use in companies.

2. Description of the Related Art

Efforts for integrating individual service networks such as telephone networks, data networks, FAX networks, and so forth which have been developed and constructed over 100 years of history into one network system with ISDN (Integrated Services Digital Network) have been made throughout the world.

As the first step for constructing the ISDN system, narrow band ISDN systems have been operated in advanced countries including Japan since 1988. In addition, besides integration with a broadcasting network by using a broadband ISDN based on the ATM technologies, the engineering developments of the ISDN network have been initiated by CCITT (International Telegraph and Telephone Consultative Committee) and promoted in major laboratories in the world.

On the way of introduction, development, and popularization of the broadband ISDN for use in companies, it can be estimated that small capacity systems on the order of several ten of terminal equipments to several hundreds of terminal equipments as initial installations will be expanded to large capacity systems of for example 16000 terminal equipment.

Thus, from the standpoint of cost required for the expansion, a consistent architecture is preferable for the broadband switching network for use in companies.

However, thus far, a broadband switching network with a consistent architecture has not been proposed. Thereby, the broadband ISDN for use in companies has not been satisfactorily introduced.

As was described above, since the architecture of the systems has not been consistent in the introduction stage, the development stage, and the popularization stage, equipment which has been introduced cannot be effectively used for expanding the systems and thereby result in many losses.

SUMMARY OF THE INVENTION

An object of the present invention is to solve such a problem and to provide broadband switching networks which can be constructed with the same architecture as that from small capacity systems to large capacity systems.

To accomplish the above mentioned object, the broadband switching network according to the present invention is a broadband switching network for transmitting information by using a cell composed of an information field and a header, the network comprising a first network having a plurality of access nodes for multiplexing and demultiplexing the cell and a ring shape transmission path for connecting the plurality of access nodes in a ring shape so as to transmit the cell, and a second network connected to at least one of the plurality of access nodes, the second network having a switching function for relaying and switching the cell.

In addition, by any combination of the broadband switching node and the first network connected therewith, the system can be expanded from a small capacity system into a large capacity system with the same architecture.

DESCRIPTION OF PREFERRED EMBODIMENTS

With reference to the accompanying drawings, an embodiment of the present invention will be described. The same portions of each drawing use the same reference numerals. The description of overlapped portions is omitted.

SMALL CAPACITY SYSTEMS

Figure 1:
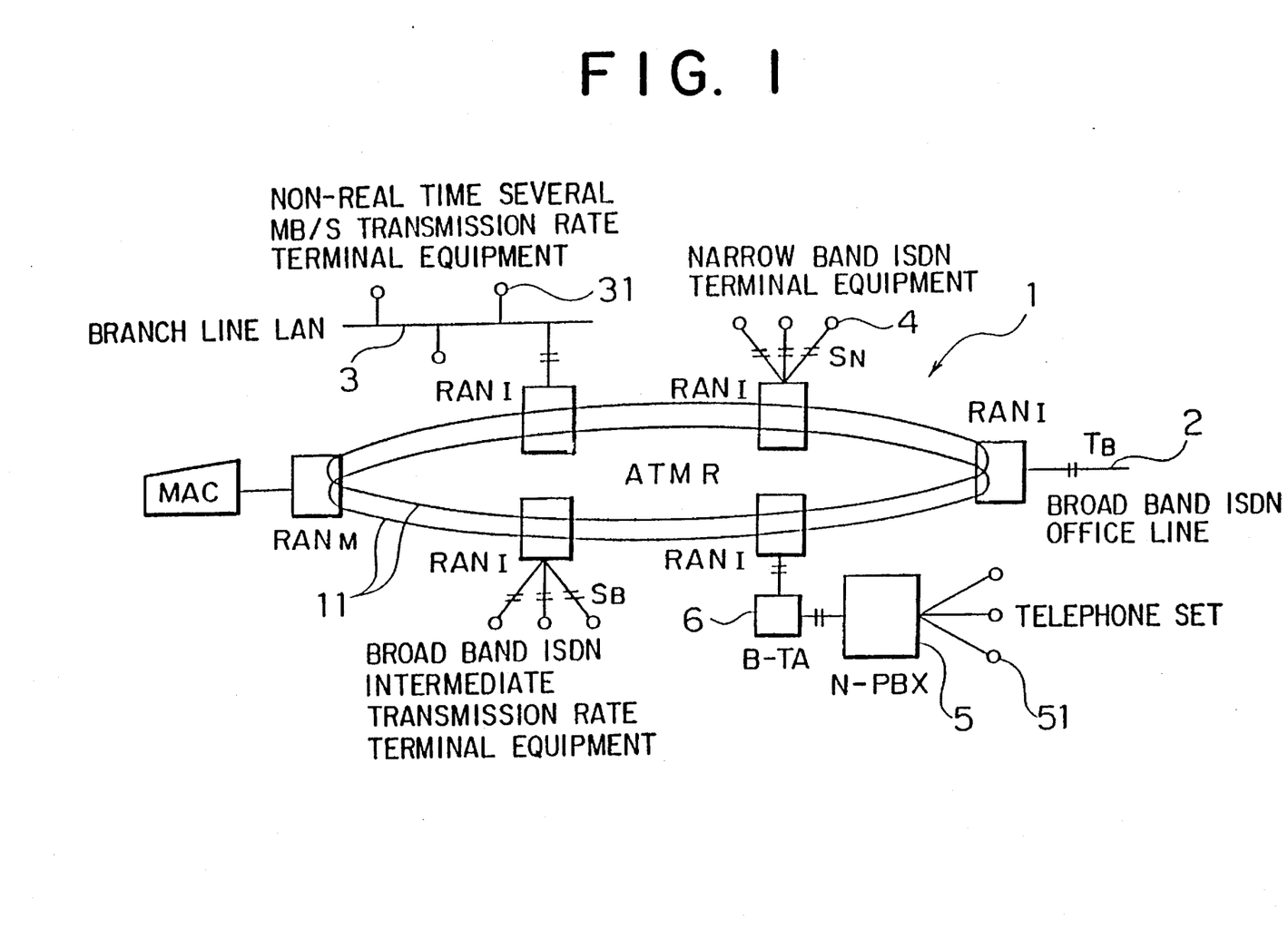
FIG. 1 is a schematic showing a construction of a small capacity system of a broadband switching system according to an embodiment of the present invention.

FIG. 1 is a schematic showing a construction of a small capacity system of a broadband switching network according to an embodiment of the present invention.

In the figure, reference numeral 1 is an ATM ring (hereinafter named the ATMR).

The ATMR 1 is composed of two types of ring access nodes (hereinafter named the RANs), a maintenance console (hereinafter named the MAC), and two systems of optical rings 11.

The RAN is provided with a terminal equipment interface accommodating ring access node (hereinafter named the $RAN_I$) for accommodating various terminal equipment interfaces, an office line interface, and so forth; and a call process management ring access node $RAN_M$ for performing the call process, the maintenance, and the management of the entire ATMR 1.

The ATMR 1 is connected to a broadband ISDN office line 2 through one of RANs$_I$. In addition, the RAN$_I$ is connected for example to a bronch line LAN (Local Area Network) 3, which is connected with non-real time several Mb/s transmission rate terminal equipments 31; narrow band ISDN terminal equipments 4; an STM base PBX (N-PBX) 5; broadband ISDN intermediate transmission rate terminal equipments 6; and so forth. The N-PBX 5 is connected with non-ISDN terminal equipments 51. The narrowband ISDN PBX 5 is connected to the RAN$_I$ through a terminal adapter (B-TA) 6.

The ATMR 1 in the above mentioned construction can operate autonomously without a connection with a distributed switch tandem node (hereinafter named the ATMT). Thus, small capacity systems in the range from several terminal equipments to several hundred terminal equipments can be inexpensively constructed.

The RAN$_I$ can accommodate for example six lines of LAN interfaces, six lines of S$_B$ interfaces, eight lines of narrow band ISDN interfaces, one line of 1.5 Mb/s primary group interface, one line of 6.3 Mb/s high transmission rate digital line interface, or the like depending on the selection of a terminal equipment interface card thereof.

In particular, the RAN$_I$ which accommodates an interface card that connects an office line or an ATMT (not shown in the figure) is provided with functions for supplying a clock to the ATMR 1 and for monitoring it and a traffic shaping function for suppressing the burstiness of cell flow and so forth.

For example, the traffic shaping function may be realized as described in "Recommendations Drafted by Working Party XVIII/8 (General B-ISDN Aspects) to be Approved in 1990" by the Study Group XVIII (Geneva Meeting, 23–25 May 1990), CCITT Report R 34.

In the above conventional device, a buffer is provided in RAN$_I$s as an interface to the broadband ISDN office line 2. When a flow of cells concentrates on a broadband ISDN office line 2, the buffer stores the cells and each cell stored in the buffer flows into the broadband ISDN office line 2 with a determined delay time.

In addition, the ATMR 1 can accommodate up to 63 RANs. In particular, the RAN$_M$, can be duplexed. Even if the power of the MAC is turned off, the ATMR can be continuously operated. By connecting a plurality of MACs to the RAN$_M$, they can be used for dedicated functions such as data setting, status display, charging process, and traffic calculation.

In FIG. 1, the STM base N-PBX 5 can interwork with the broadband switching network through the primary group interface (H11) and thereby mutually communicate with narrow ISDN telephone terminal equipments in the system, and access the broadband ISDN network. In addition, with an ATM cell through a multiplex interface such as the above mentioned primary group interface or a TTC 2M standard interface in the circuit emulation method, a dedicated line on the broadband ISDN base can communicate with an N-PBX at a distant location through a broadband switching network thereof. Thus, since the broadband ISDN dedicated line is shared with another broadband traffic, the communication cost can be decreased.

Figure 2:
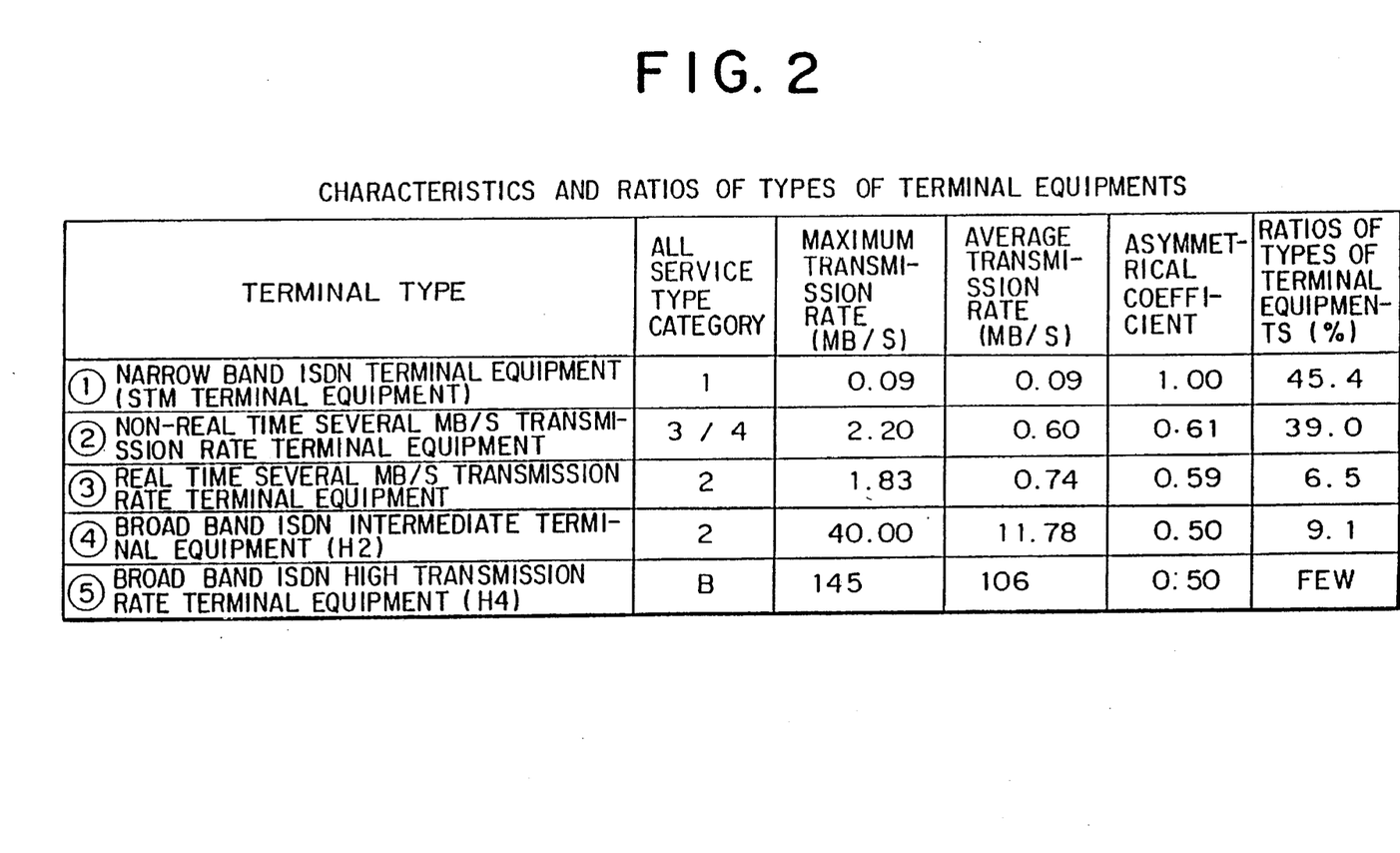
FIG. 2 is a table showing an example of characteristics and ratios of various terminal equipments connected to a broadband switching network.

The number of terminal equipment interfaces that the ATMR 1 can accommodate is determined by the limitation of the traffic peak load ratio. The traffic peak load ratio is a ratio of the sum of the maximum transmission rate that the user declares before making a communication (or the average transmission rate for a call which does not require a real time communication) and the payload capacity. In other words, the RAN$_I$ which is connected to an office line with the heaviest load should satisfy the following equation.

$$N \times \eta \times (Ct+Ce) \times Sp \times \alpha \leq Tp \times \psi p \times \epsilon \times R \qquad (1)$$

where $Sp=\Sigma (Si \times Ni \times Bi)$ (=2.07 Mb/s, from FIG. 2);

N: Number of terminal equipment interfaces which can be accommodated $\eta$=0.3: Ratio of terminal equipments which are used in the maximum load state $Ct$=1.0: Ratio of bidirectional connections of office line $Ce$=0.5: Ratio of bidirectional connections of extension $\alpha$: Safety ratio $Tp$=149.76 Mb/s: Payload capacity $\psi p$=95%: Traffic peak ratio $\epsilon$=2.0: Average reuse ratio of cells $R$=2: Number of rings Si: Maximum/average transmission rate of terminal equipment (Average transmission rate for non-real time several Mb/s transmission rate terminal equipment)

Bi: Asymmetrical coefficient

Ni: Ratio of terminal equipments

The average reuse ratio of cells, $\epsilon$, which is intrinsic to the ATMR is in the range from 1 to 4 depending on the traffic distribution therein. However, in consideration of concentration of the traffic to the RAN$_I$ which accommodates the office line, in this embodiment, the average reuse ratio of cells $\epsilon$ is set to 2.0.

FIG. 2 is a table showing an example of the terminal equipment maximum/average transmission rate, the asymmetrical coefficient, and the ratio of terminal equipments.

If the safety ratio is not considered in the equation (1), the number of terminal equipment interfaces which can be accommodated, N, is 609 or less.

In addition, when N is 400, the safety ratio, $\alpha$, becomes 1.5 or less.

Thus, in consideration of a margin to a call loss of high transmission rate terminal equipments such as broadband ISDN intermediate terminal equipments and a consistency to intermediate or large capacity systems, the upper limit of the number of terminal equipment interfaces which can be accommodated preferably becomes approximately 400. When one of optical rings 11 stops due to a fault and thereby the system is operated as a single system, if N is approximately 400, the traffic amount exceeds the upper limit of which the one optical ring 11 can transmit data. Thus, in this case, all connections which are currently communicating cannot be accommodated. To prevent this, when the number of terminal equipment interfaces that the ATMR 1 accommodates is decreased to approximately 200 and the ATMR 1 is operated with the traffic amount which is half the maximum transmission capacity thereof, thus, even if such a fault takes place, all the connections can be accommodated. Even if the number of terminal equipments accommodated in one system of the ATMR 1 is decreased, although the cost of the RAN$_I$ which accommodates the RAN$_M$ and the office line is increased, the cost per terminal interface is not remarkably increased.

In addition, when the ATMR 1 accommodates 400 terminal equipments and one line of the 155 Mb/s transmission rate broadband ISDN office line (including a dedicated line service) is provided, the traffic peak load ratio, $\psi p$, over the office line can be expressed by the following equation (2)

and thereby ψp becomes 0.83 and the safety ratio (margin), α, becomes 1.14.

$$\psi p \leq (N \times \eta \times Ce \times Sp) / (Tp \times L) \quad (2)$$

where N=400

L=2: Number of transmission paths (reception and transmission)

Thus, it is found that one line of the 155 Mb/s $T_B$ interface per one system of ATMR can satisfy the above mentioned conditions.

Figure 3:
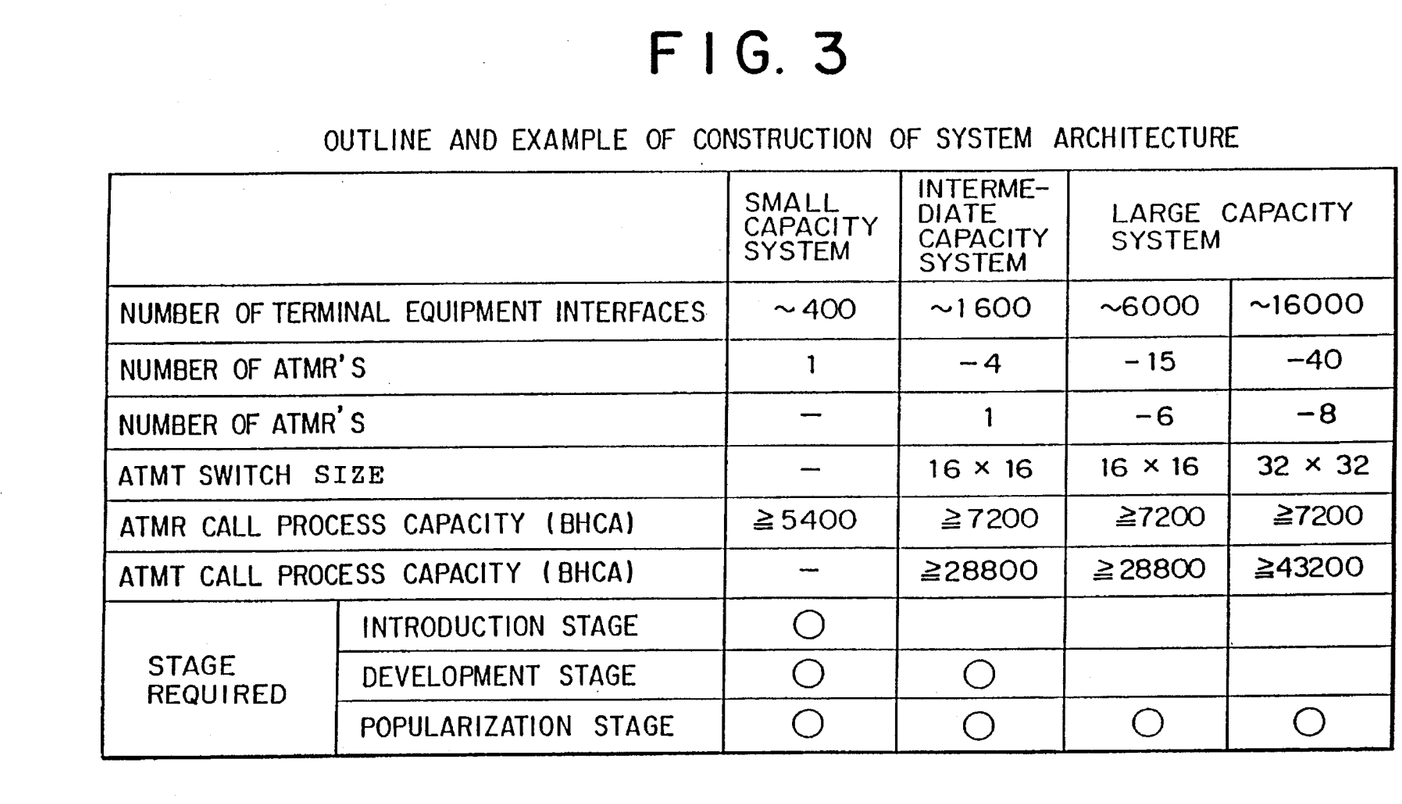
FIG. 3 is a table showing an outline of system architectures.

In addition, as shown in FIG. 3, in consideration of the interwork with the same scale N-PBX (400 lines), the call process capacity of the ATMR 1 is preferably 5400 BHCA (incompleteness ratio=1.5) or more.

INTERMEDIATE CAPACITY SYSTEMS

Now an example of an intermediate capacity system according to the present invention will be described.

Figure 4:
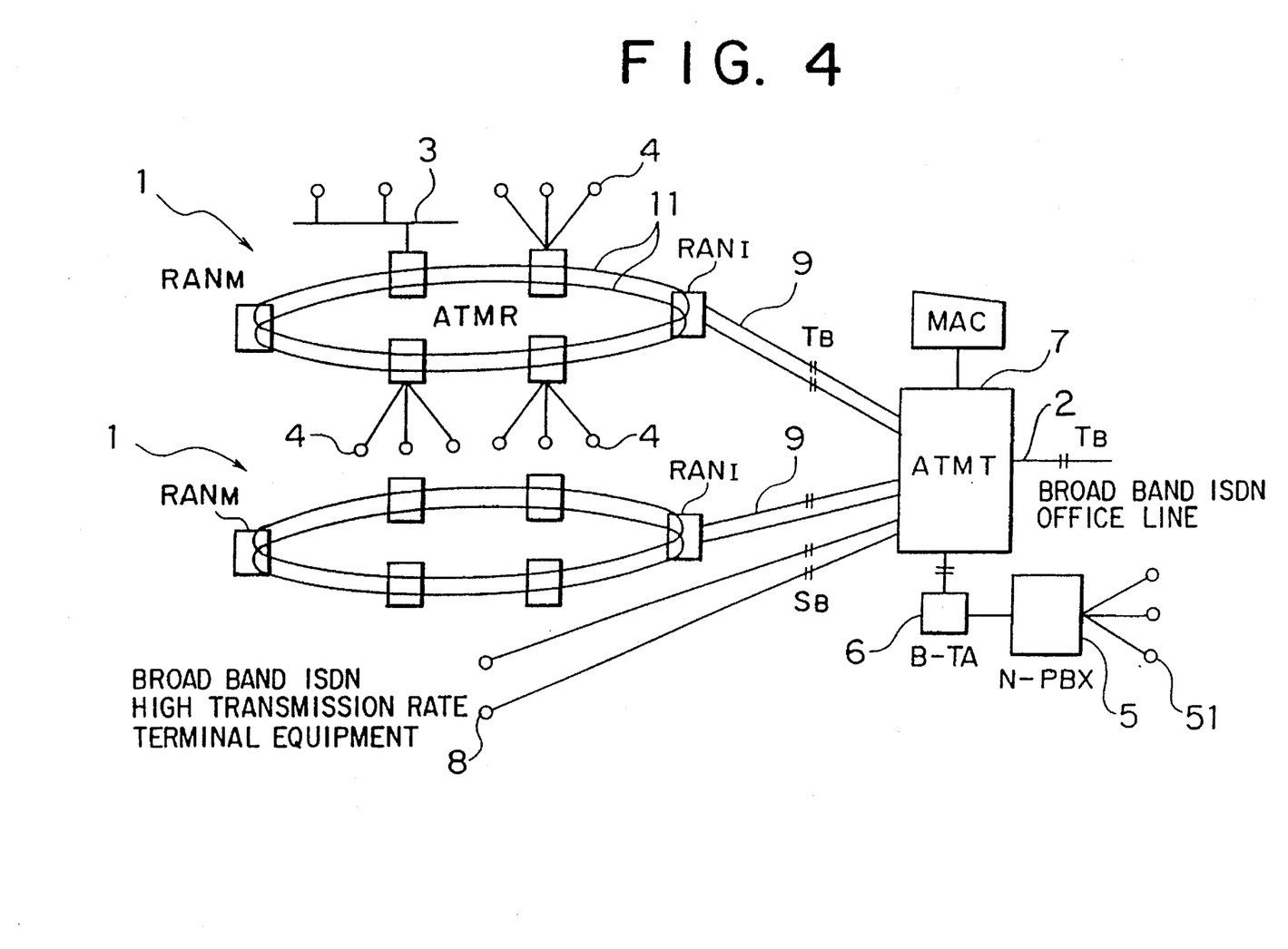
FIG. 4 is a schematic showing a construction of an intermediate capacity system of the broadband switching network according to the embodiment of the present invention.

FIG. 4 is a schematic showing a construction of an intermediate capacity system of the broadband switching network according to the embodiment of the present invention.

In the figure, reference numeral 1 is an ATMR and reference numeral 7 is an ATMT.

The ATMT 7 is connected with a plurality of systems of ATMRs 1, a broadband ISDN office line 2, an N-PBX 5, and broadband ISDN high transmission rate terminals 8. One ATMT 7 connects the plurality of systems of the ATMRs 1 in a star shape. In addition, the ATMT 7 is connected with a MAC.

The ATMT 7 is provided with an ATM switch having 16 ports (not shown in the figure). The ATMT 7 accommodates up to four systems of ATMRs 1 through a 155 Mb/s or 622 Mb/s $T_B$ interface 9. In addition, the office line interface is accommodated in the ATMT 7 so as to share the office line interface by the plurality of systems of the ATMRs 1.

The ATMR 1 is composed of two types of ring access nodes $RAN_M$ and $RAN_I$ which are connected with two systems of optical rings 11.

A common channel signaling system in accordance with the inter-PBX protocol is applied between the ATMR 1 and the ATMT 7. Thereby, advanced services such as transfer services, free numbering services, and tenant services are achieved. In addition, the ATMT 7 can accommodate an ATMR of another vendor. Moreover, multi-vendor property such as a mutual connection between other vendor products can be obtained.

In addition, the MAC connected to the ATMT 7 integratedly maintains, operates, and manages the entire system by closely connecting the ATMR 1 and the ATMT 7 with for example an internal protocol based on the NNI (Network Node Interface).

In addition, when the ATMT 7 is equipped with the interwork function with the N-PBX 5, the concentration of call amount to the ATMR 1 can be prevented.

Since the ATMT 7 is in port free construction, it can flexibly deal with the accommodation of the ATMR 1, the connection of the broadband ISDN office line, and the connection of the broadband ISDN high transmission rate terminal equipment.

In addition, by connecting the ATMR 1 and the ATMT 7 with application processors (AP), a multimedia information and a communication network which operates in conjunction with an information processing system and which provides advanced but delicate functions along with high expansibility and flexibility can be constructed.

Moreover, the ATMT 7 preferentially retrieves and/or selects a clock from a broadband ISDN network (through an office line, a dedicated line, or the like) and then supplies it to the ATMR 1. When the clock is stopped due to a fault, the ATMT 7 autonomously operates with an internal clock thereof and thereby continuing an extension system service.

The maximum number of terminal equipment interfaces N that one system of the ATMR can accommodate is approximately 400. In total, four systems of the ATMRs (with eight ports for connections of ATMRs and four ports for connections of office line connections) can be mutually connected and thereby up to 1600 terminal equipment interfaces can be accommodated.

When it is assumed that the maximum number of terminal equipment interfaces (N=400) are accommodated and all the connections in the ATMR 1 are made through the ATMT 7 between the ATMRs 1 and an ATMR of another system or a broadband ISDN office line 2, then the traffic peak load ratio ψp over the $T_B$ interface 9 between the ATMR 1 and the ATMT 7 is expressed by the following equation (3) and thereby ψp becomes 0.83 and the safety ratio, α, becomes 1.14.

$$\psi p \leq (N \times \eta \times (Ct+Ce) \times Sp) / (Tp \times L \times M) \quad (3)$$

where $$Sp = \Sigma(Si \times Ni \times Bi) \text{ (=2.07 Mb/s, from FIG. 2)}$$

accommodate

η=0.3: Ratio of terminal equipment which are used in the maximum load state

Ct: Ratio of bidirectional connections of office line

Ce: Ratio of bidirectional connections of extension;

Ct=Ce=1 (There is no closed connection in the ATMR 1.)

Tp=147.76 Mb/s: Payload capacity

ε=2.0: Average reuse ratio of cells

R=2: Number of rings

Si: Maximum/average transmission rate of terminal equipment (Average transmission rate for non-real time several Mb/s transmission rate of terminal equipment)

Bi: Asymmetrical coefficient

Ni: Ratio of terminal equipments

L=2: Number of transmission paths (reception and transmission).

M=2: Number of $T_B$ (155 Mb/s) interfaces between ATMR 1 and ATMT 7.

In other words, it is necessary to assign one line of the 155 Mb/s $T_B$ interface per ring or half the band of the 622 Mb/s $T_B$ interface per system of the ATMR. Moreover, in the same condition, since the traffic peak load ratio in the ATMR 1 becomes 0.83, the matching property between the ATMR 1 and the ATMT 7 becomes high.

In addition, as was described in the section of the small capacity systems, when a fault takes place in the ATMR 1, in order to relieve all connections, the number of terminal equipment interfaces per system of ATMR should be limited to 200 or less. In this case, it is possible to provide one line of the 155 Mb/s $T_B$ interface between the ATMR 1 and the ATMT 7. Although the cost slightly increases because of necessity of two $RANm^s$, the number of terminal equipment interfaces which can be accommodated as the system is not changed.

In addition, the traffic peak load ratio over the broadband ISDN office line 2 per system of the ATMR is equal to the value obtained in the above mentioned equation (2). Thus, the ATMT 7 should accommodate up to four lines of the 155 Mb/s $T_B$ interfaces or one line of the 622 Mb/s $T_B$ interface.

In addition, the broadband ISDN high transmission rate terminal equipment 8 is directly connected to the ATMT 7 through an $S_B$ interface. In the maximum construction where four systems of the ATMRs 1 are connected, as was described above, since 12 of 16 ports of the ATM switch resources of the ATMT 7 are used, four ports are assigned to the broadband ISDN high transmission rate terminal equipment 8. In addition, for a user who uses many connections of the broad band ISDN high transmission rate terminal equipments at the same time, the number of connections of the ATMRs 1 is limited. As another method, a plurality of ATMTs 7 are mutually connected. As another method, an ATMT with 32 ports can be used.

In addition, in the maximum construction where four systems of the ATMRs 1 are connected, as shown in FIG. 3, the call process capacity of the ATMT 7 including the interface with the same scale N-PBX (1600 lines) should be 28800 BHCA (incompleteness ratio is 1.5) or more. When all the connections in the ATMR 1 are made through the ATMT 7, the call process capacity of the ATMR 1 should be 7200 BHCA or more.

LARGE CAPACITY SYSTEMS

Then, an example of a large capacity system necessary in the popularization stage for use in companies will be described.

Figure 5:
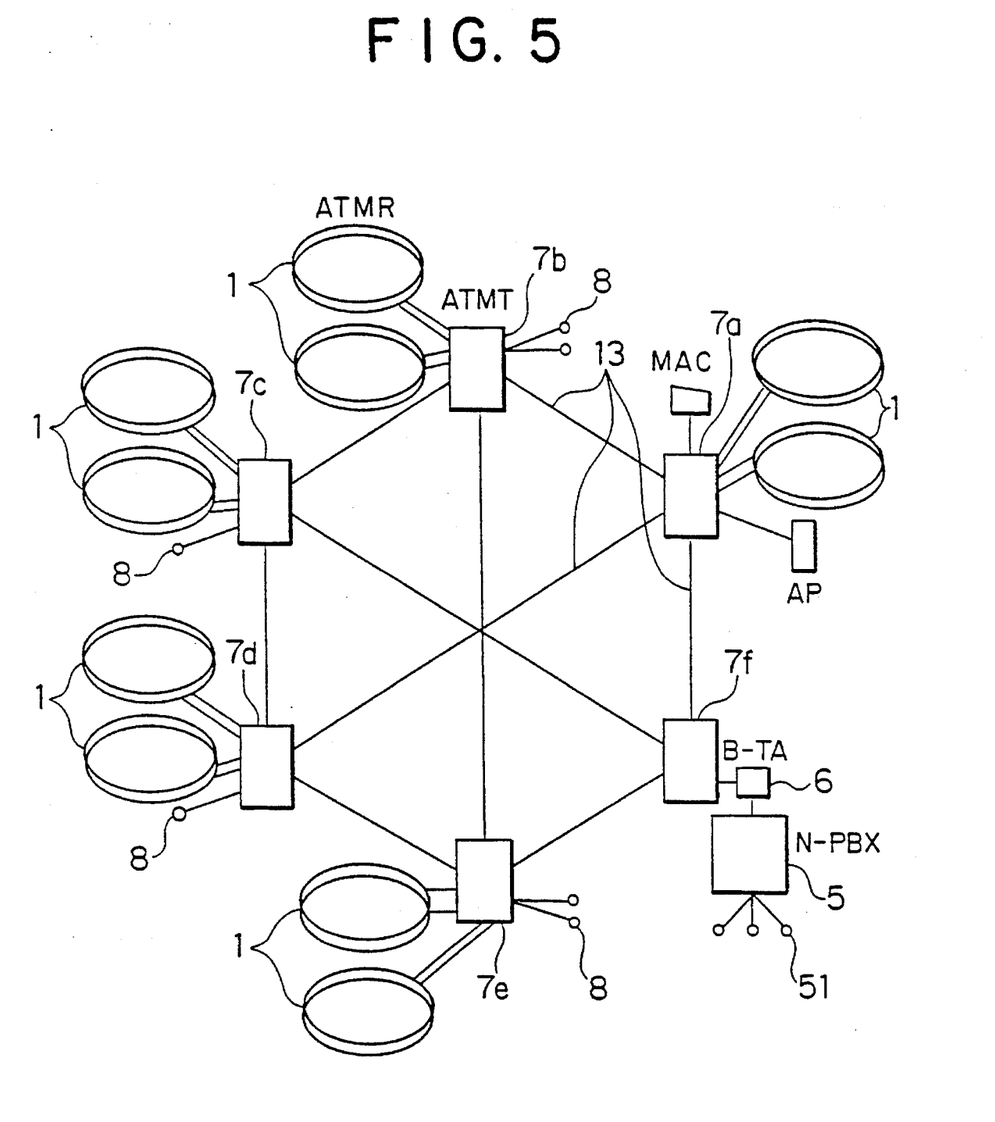
FIG. 5 is a schematic showing a construction of a large capacity system of the broadband switching network according to the embodiment of the present invention.

FIG. 5 is a schematic showing a construction of a large capacity system of the broadband switching network according to the embodiment of the present invention.

In the figure, reference numeral 1 is an ATMR which can accommodate up to 400 terminal equipments and reference numerals 7a to 7f are ATMTs with 16 ports.

The ATMTs 7a to 7f are circumferentially disposed. Regularly, any ATMT 7 is connected with another ATMT 7 through a three-way transmission path (link) 13 in a wheel shape. In addition, any ATMT 7 is connected to a broadband ISDN office line (not shown in the figure) with three ports.

Each of ATMTs 7a to 7e is connected to two systems of ATMRs 1.

In addition, the ATMT 7a is connected with an MAC and an application processor (AP). On the other hand, the ATMT 7f is connected with an N-PBX 5 through a B-TA 6.

In the construction shown in FIG. 5, up to 4000 terminal equipment interfaces are accommodated. Each of ATMTs 7a to 7e is connected with three systems of ATMRs 1. The entire system can accommodate 6000 terminal equipment interfaces with connections of 15 systems of ATMRs 1. In addition, the above system can be constructed with three ATMTs with 32 ports. Moreover, as an ultra large capacity system, a system which accommodates 16000 terminal equipment interfaces can be accomplished by using eight 32-port ATMTs with connections of 40 systems of ATMRs 1.

When the 16000 terminal equipment interfaces are accommodated by using eight 32-port ATMTs, each ATMT should have 10 ports for connections with the ATMR 1, five ports for connections with the office line, and 14 ports for connections with a link between the ATMTs.

In other words, since the traffic peak load ratio ψp at each port or in the ATMR 1 distributes in the range from 0.78 to 0.89 (the safety ratio is in the range from 1.07 to 1.22), the resources in the system can be almost equally used with high efficiency.

When the ATMR 1 is operated at a high transmission rate (622 Mb/s) and the capacity of the ATMT 7 is increased (with 64 ports or 128 ports), the traffic transmission capacity can be quadrupled in the same architecture without tradeoffs of the equality of services, the consistency of cost performance and reliability, the accomplishments of excellent flexibility/expansibility and standardization/multi-vendor property, and the unification of system maintenance and management.

Now another construction of mutual connections between the ATMTs 7 will be described.

Figure 6:
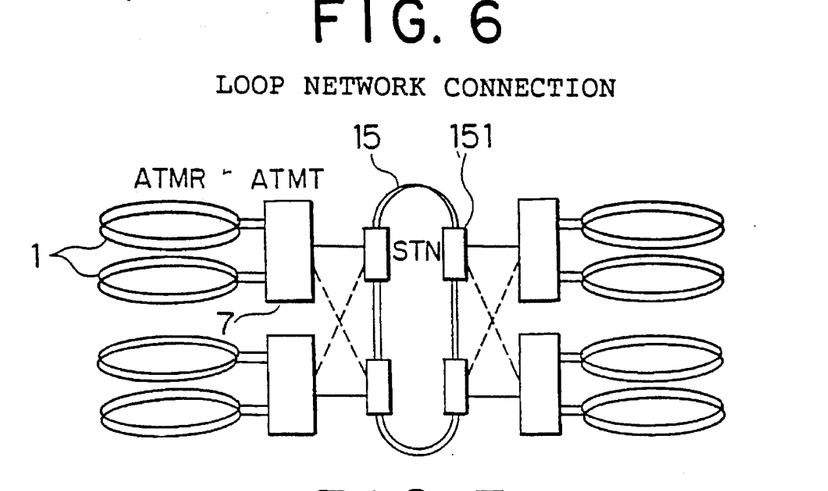
FIG. 6 is a schematic showing a construction of ATMTs mutually connected with a loop network linkage.

FIG. 6 is a schematic showing an example of mutual connections among the ATMTs 7 with an ultra high transmission rate optical loop network 15. As shown in the figure, the ATMTs 7 are connected with stations (STNs) 151 over the optical loop network 15. In addition, the ATMTs 7 are mutually connected with other ATMTs 7 over the optical loop networks 15.

In the construction shown in FIG. 6, since signals flow in one direction. Thus, the routing control among the ATMTs 7 can be simplified. In addition, even with only one type of ATMTs, wide applications can be covered.

Against a fault, for example a dual homing system is used. In this construction, each ATMT 7 is connected with two STNs 151. When a fault takes place on the homing side STN 151 (in other words, the STN 151 to and from which the ATMT 7 transmits and receives signals), the homing side is switched to another STN 151. In addition, the optical network 15 can be also duplexed. Moreover, fault countermeasures such as loop-back or bypass against disconnection of the defective STN can be performed.

Figure 7:
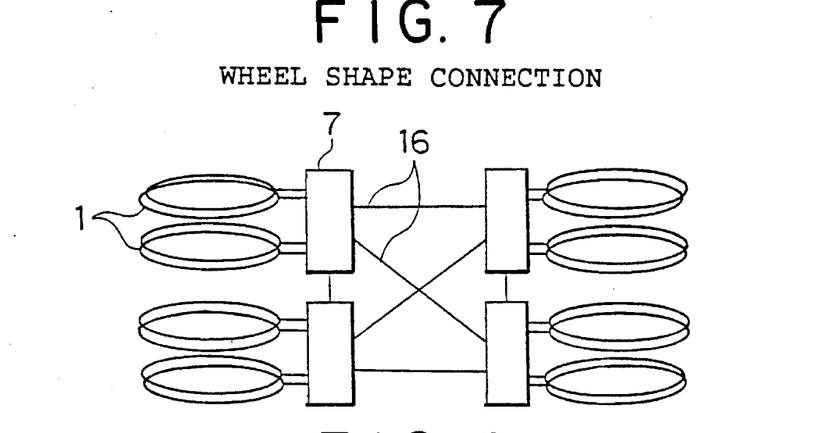
FIG. 7 is a schematic showing a construction of ATMTs mutually connected with a wheel shape linkage.

FIG. 7 is a schematic showing the construction of the system shown in FIG. 5. The ATMTs 7 are connected with three-way transmission paths (links) 16 in a wheel shape. This construction distributes the traffic into the entire system.

In this construction, as was described above, approximately up to eight ATMTs 7 can be mutually connected. The ATMTs can be linked with a standard interface transmission rate of 155 Mb/s or 622 Mb/s.

Against a fault, an advanced routing control is performed over redundant paths mutually connected from one ATMT to other three ATMTs.

Figure 8:
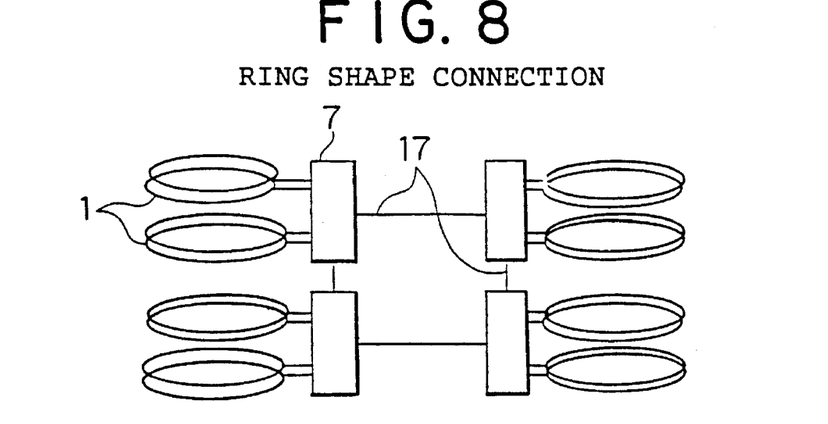
FIG. 8 is a schematic showing a construction of ATMTs mutually connected with a ring shape linkage.

FIG. 8 is a schematic showing an example of a construction where the ATMTs (links) 7 are connected in a ring shape. In this construction, the routing control of the loop network can be simplified and the link among the ATMTs 7 of the wheel shape network can be accomplished at a standard interface transmission rate.

Against a fault of one ATMT or the link among the ATMTs, the routing control is performed like the wheel shape network.

Figure 9:
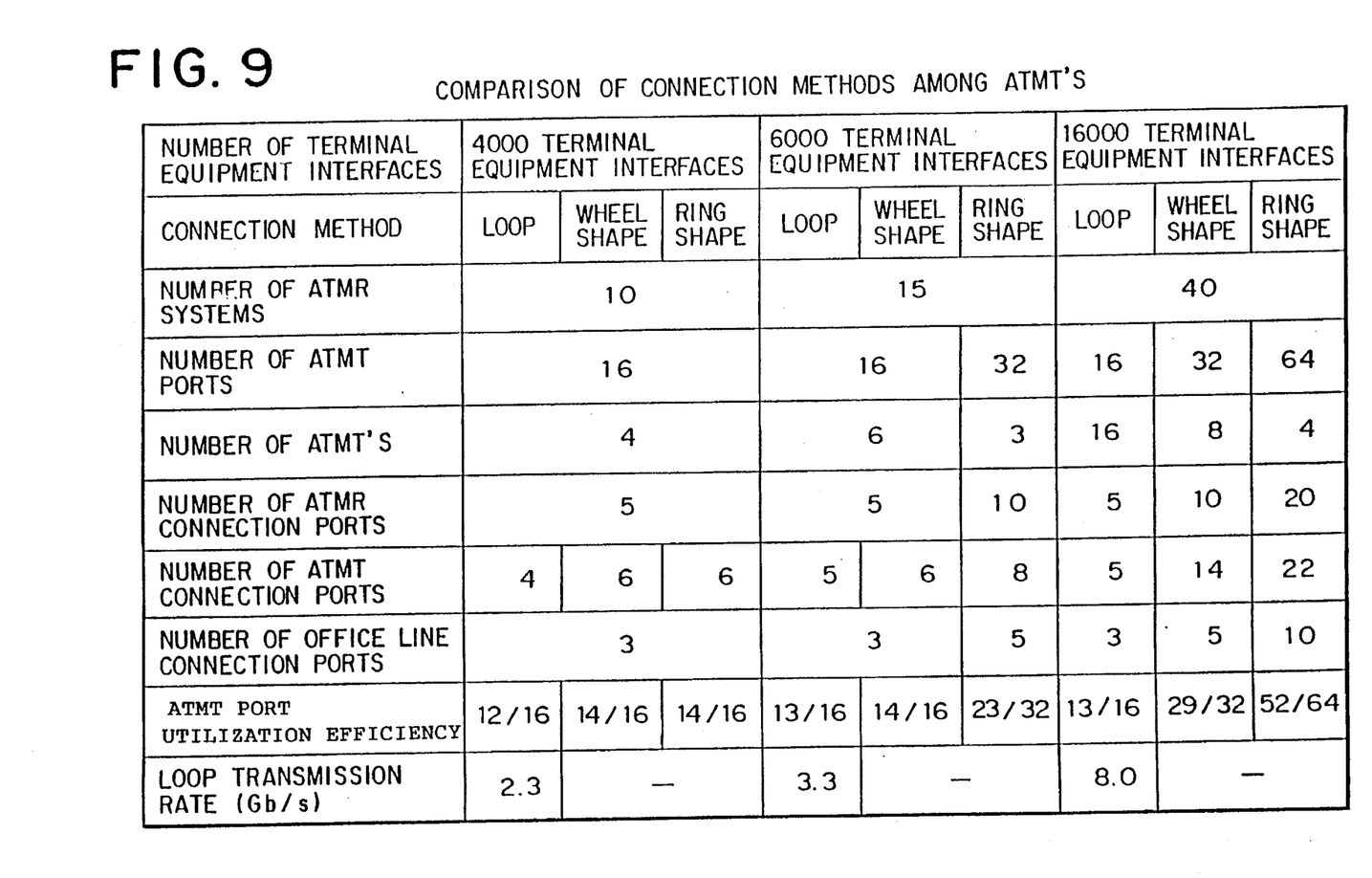
FIG. 9 is a table showing examples of constructions of broadband switching networks by the number of terminal equipment interfaces and by methods mutually connected among ATMTs.

FIG. 9 is a table showing the comparison of the loop network linkage, the wheel shape network, and the ring shape network for accommodating 4000, 6000, and 16000 terminal equipment interfaces. In this table, it is assumed that the traffic peak load ratio is 90% or less.

As shown in the figure, in any construction, up to 4000 terminal equipment interfaces can be accommodated by using four ATMTs with 16-port ATM switches. The number of ports used for data transmission among the ATMTs is four ports for the loop network linkage, and six ports for each of the wheel shape network and the ring shape network. When the ports for connections with the ATMRs and the office line are added, the number of ports for the loop network linkage is 12 ports and that for each of the wheel shape network and the ring shape network is 14 ports. The number of ports for the loop network linkage is two ports smaller than those for other methods. However, the former method has to use a 2.3 Gb/s optical loop network. The two or four ports which are not used can accommodate broadband ISDN high transmission rate terminal equipments and/or N-PBXs.

When the 6000 terminal equipment interfaces are accommodated, the loop network linkage and the wheel shape network can be constructed by using six ATMTs with 16-port ATM switches. However, the ring shape network can be constructed by using three ATMTs with 32-port ATM switches. In other words, for the ring shape network, the number of ports in use for data transmission among the ATMTs is increased. In addition, for the loop network linkage, a 3.3 Gb/s optical loop network is required.

When the 16000 terminal equipment interfaces are accommodated in the loop network linkage, 16 ATMTs with 16 ports and an 8 Gb/s optical loop network are used; in the wheel shape network, eight ATMTs with 32 ports are used; and in the ring shape network, four ATMTs with 64 ports are used.

Figure 10:
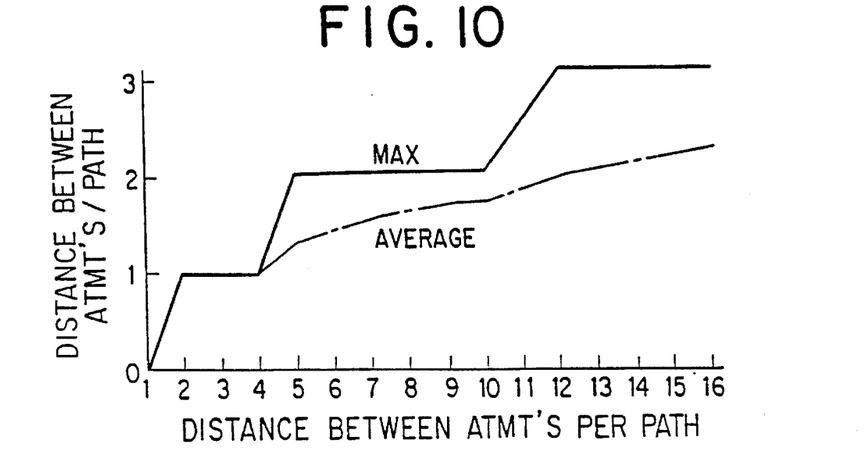
FIG. 10 is a diagram showing the relation between the distance between ATMTs per path and the number of ATMTs.
Figure 11:
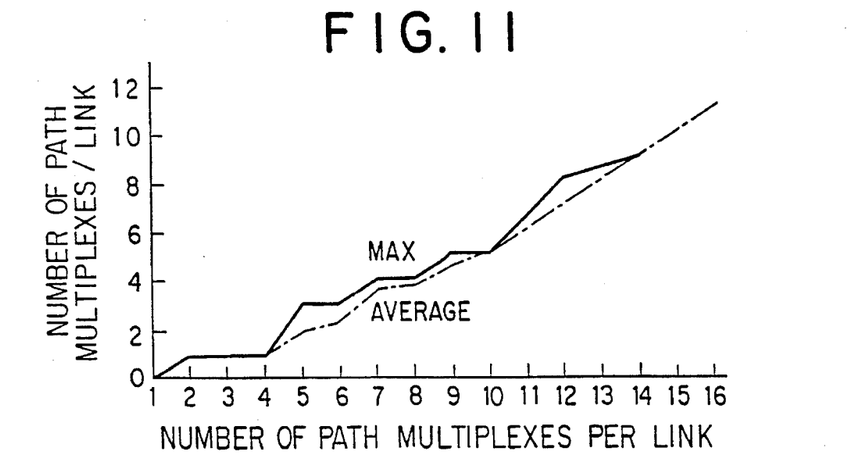
FIG. 11 is a diagram showing the relation between the number of path multiplexes per link and the number of ATMTs.
Figure 12:
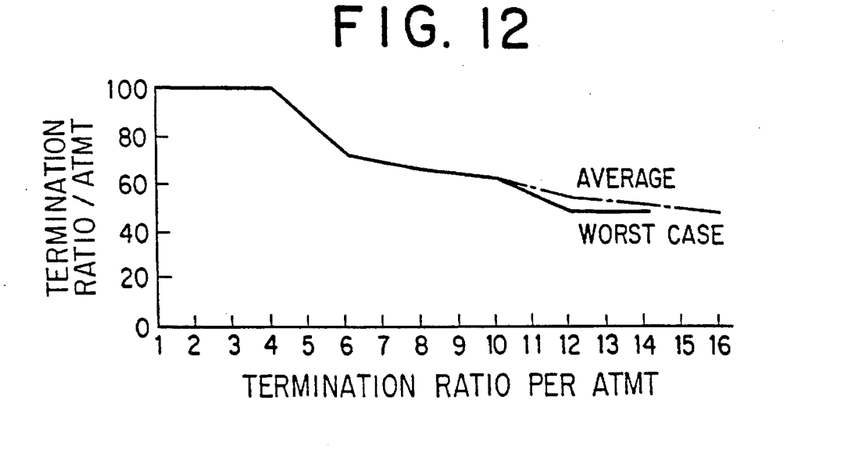
FIG. 12 is a diagram showing the relation between the termination ratio per ATMT and the number of ATMTs.

FIGS. 10, 11, and 12 are diagrams showing the distance between the ATMTs per path, the number of path multiplexes, and the termination ratio in a non-hierarchical network construction where the distance between the ATMTs is minimum and the traffic is distributed over the entire system (for example, a wheel shape network is used when the number of ATMTs is 10 or less; a double ring shape network is used when the number of ATMTs is 11 or more) on the assumption that the direction of the traffic is at random and that the ATMTs are normally connected with three ways.

As shown in FIG. 11, the maximum number of path multiplexes is nearly equal to the average number of path multiplexes. Thus, it is found that the traffic is almost equally distributed over the network as the above mentioned first feature. In addition, as shown in FIG. 12, the worst case value of the termination ratio is almost equal to the average value of the termination ratio.

As shown in FIGS. 10, 11, and 12, when the number of ATMTs is 11 or more, the distance between ATMTs becomes 3 or more; the number of path multiplexes becomes 5 or more; and the termination ratio becomes 50% or less. In other words, 50% or more of the switching resources of the ATMTs are used only for relaying with other ATMTs. On the other hand, when the number of ATMTs is 10 or less, it is possible to keep the termination ratio 60% or more. Furthermore, in the same network construction, it is possible to increase and decrease the number of the ATMTs. In other words, when one ATMT is expansively increased, it is necessary to disconnect up to two ATMT links and then to add new three links.

In addition, as shown in FIG. 11, when a system is constructed with eight ATMTs, the number of path multiplexes per link becomes up to 4. In other words, since the number of paths routed from one ATMT to other ATMTs is 7, the 4/7 of the entire traffic flows in the link. Thus, the large capacity system which accommodates the 16000 terminal equipment interfaces can be constructed with around one line of transmission path with a transmission rate of 622 Mb/s at the link among the ATMTs rather than using an expensive, high transmission rate transmission path of Gb/s class.

In addition, since redundant links are routed among the ATMTs, a temporary deviation of the traffic can be solved with a flexible routing control without need for of special trouble countermeasures such as the switching of the homing side against the fault. Thus, it is possible to construct a system with strong resistance against the traffic deviation.

As was described above, the preferable number of the ATMTs for the wheel shape network is eight in consideration of an allowance for 2 ATMTs so as to provide flexibility and expandability after installation.

The optical fibers connected among the ATMTs are routed in a wheel shape. However, when a multiple-wire cable is routed in one stroke shape along the ATMTs, the routing work can be simplified.

In the above description, it was assumed that the traffic was almost equally distributed over the entire network. However, due to restrictions over real routing or the like, the office line may be concentratedly accommodated in one ATMT and thereby the traffic may deviate. In this case, when the connection shape among the ATMTs on the basis of wheel shape linkage, the link band (the number of ports assigned), and the capacity of the ATMTs can be properly selected, the deviation of the traffic can be solved with high flexibility. In other words, in the wheel shape network, only the connection interface between the ATMR and the ATMT restricts the flow of the traffic. Thus, the deviation of the traffic with respect to the centralized accommodation of the office line can be solved with high flexibility.

Next, the aspects of the wheel shape network composed of approximately eight ATMTs will be summarized.

First, when the direction of the traffic is random, the traffic over the network can be equally distributed without deviation to a particular link. Second, the number of links which construct a path between two ATMTs (namely, the distance between two ATMTs) can be decreased to as small as 2 or less. Third, when paths are routed among the entire ATMTs, the number of path multiplexes at each link can be decreased to as small as 4 or less. Fourth, the termination ratio can be kept as many as 64% or more. The termination ratio is a ratio of paths which are terminated by a particular ATMT in all paths which flows therein. The lower the termination ratio, the more the number of relays of a cell between two ATMTs. Thus, the switching resources are used with many losses. Fifth, the number of ATMTs can be easily increased and decreased. Sixth, a transmission path with the standard interface transmission rate of 155 Mb/s or 622 Mb/s can be used among the ATMTs and thereby the cost reduction is expectable. Seventh, since the ATMTs are redundantly connected, a trouble over a particular transmission path or in an ATMT does not affect the entire system without countermeasures such as switching of homing side. Eighth, since the flexibility of designs with respect to the link connection shape between the ATMTs, the link band (the number of ports assigned), and so forth is high, the user's needs can be satisfied with high flexibility.

What is claimed is:

1. A broadband switching network for transmitting information by using a cell having an information field and a header, said network comprising:

a plurality of first networks, each having a plurality of access nodes for multiplexing and demultiplexing said cell and having a ring shape transmission path for connecting said plurality of access nodes in a ring shape so as to transmit said cell; and a second network having a plurality of switches and a separate interface connected to one of said access nodes in each one of said plurality of first networks, for relaying and switching said cell; and transmission paths for connection to said switches so as to transmit said cell.

2. The broadband switching network as set forth in claim 1, wherein said ring shape transmission path comprises two transmission paths in one direction.

3. The broadband switching network as set forth in claim 1, wherein each said first network is arranged to autonomously operate.

4. The broadband switching network as set forth in claim 2, wherein each said first network is arranged to autonomously operate.

5. The broadband switching network as set forth in claim 1, wherein each said first network has a call process, maintenance, and management ring access node for call processing, system maintaining, and managing each said first network.

6. The broadband switching network as set forth in claim 2, wherein each said first network has a call process, maintenance, and management ring access node for call processing, system maintaining, and managing each said first network.

7. The broadband switching network as set forth in claim 3, wherein each said first network has a call process, maintenance, and management ring access node for call processing, system maintaining, and managing each said first network.

8. The broadband switching network as set forth in claim 4, wherein each said first network has a call process, maintenance, and management ring access node for call processing, system maintaining, and managing each said first network.

9. The broadband switching network as set forth in claim 1, wherein each said first network has a traffic shaping function for suppressing burstiness of the flow of said cell.

10. The broadband switching network as set forth in claim 2, wherein each said first network has a traffic shaping function for suppressing burstiness of the flow of said cell.

11. The broadband switching network as set forth in claim 3, wherein each said first network has a traffic shaping function for suppressing burstiness of the flow of said cell.

12. The broadband switching network as set forth in claim 5, wherein each said first network has a traffic shaping function for suppressing burstiness of the flow of said cell.

13. The broadband switching network as set forth in claim 1, further comprising a plurality of said second networks, at least some of said second networks having Separate interfaces connected to one of said access nodes in each said first network in different pluralities of said first networks, wherein said second networks are connected by said plurality of transmission paths in a wheel shape.

14. The broadband switching network as set forth in claim 1, further comprising a plurality of said second networks, at least some of said second networks having separate interfaces connected to one of said access nodes in each said first network in different pluralities of said first networks, wherein said second networks are connected by said plurality of transmission paths in a ring shape.

15. The broadband switching network as set forth in claim 1, further comprising a plurality of said second networks, at least some of said second networks having separate interfaces connected to one of said access nodes in each said first network in different pluralities of said first networks, wherein said second networks are connected by said transmission paths with an optical loop network having a plurality of stations and an optical loop transmission path for connecting said plurality of stations in a loop shape.

16. The broadband switching network as set forth in claim 15, wherein at least one of said plurality of stations is connected by said transmission paths to two or more of said plurality of second networks.

\* \* \* \* \*

UNITED STATES PATENT AND TRADEMARK OFFICE
CERTIFICATE OF CORRECTION

PATENT NO. : 5,566,179
DATED : October 15, 1996
INVENTOR(S) : Hiroshi KOBAYASHI et al.

It is certified that error appears in the above-indentified patent and that said Letters Patent is hereby corrected as shown below:

Claim 13, column 12, line 12, "Separate" should read --separate--.

Signed and Sealed this

Twenty-ninth Day of April, 1997

Attest:

BRUCE LEHMAN

*Attesting Officer*     *Commissioner of Patents and Trademarks*